United States Patent [19]
Lee et al.

[11] Patent Number: 5,743,939
[45] Date of Patent: Apr. 28, 1998

[54] WASTE GAS PROCESSING APPARATUS AND METHOD FOR SEMICONDUCTOR FABRICATING EQUIPMENT

[75] Inventors: Sang-min Lee; Hong-rok Choi; Young-soek No; Yung-ho Kim, all of Suwon, Rep. of Korea

[73] Assignee: Samsung Electronics Co., Ltd., Suwon, Rep. of Korea

[21] Appl. No.: 718,670

[22] Filed: Sep. 24, 1996

[30] Foreign Application Priority Data

Oct. 11, 1995 [KR] Rep. of Korea .................. 95-34994

[51] Int. Cl.$^6$ .................. B01D 50/00; B01D 47/00
[52] U.S. Cl. .................. 95/214; 55/259; 55/261; 55/265; 45/216; 96/189
[58] Field of Search .................. 95/149, 214, 254, 95/216; 55/257.1, 259, 261, 265, 220; 96/188, 189

[56] References Cited

U.S. PATENT DOCUMENTS

| | | | |
|---|---|---|---|
| 2,999,560 | 9/1961 | Seefluth | 96/189 |
| 3,755,990 | 9/1973 | Hardison | 55/259 |
| 3,823,531 | 7/1974 | Crawley | 55/261 |
| 3,844,740 | 10/1974 | Brandt | 55/265 |
| 3,883,329 | 5/1975 | Dupps, Sr. | 55/259 |
| 4,022,593 | 5/1977 | Lerner | 95/214 |

*Primary Examiner*—Duane S. Smith
*Attorney, Agent, or Firm*—Cushman Darby & Cushman Intellectual Property Group of Pillsbury Madison & Sutro LLP

[57] ABSTRACT

The waste gas processing apparatus and method thereof for semiconductor device fabricating equipment includes a water spraying chamber, and an exhaust tube. A demister and an external gas introducer, for causing external gas to enter the exhaust tube adjacent the demister, are installed in the exhaust tube.

10 Claims, 1 Drawing Sheet

WASTE GAS PROCESSING APPARATUS AND METHOD FOR SEMICONDUCTOR FABRICATING EQUIPMENT

BACKGROUND OF THE INVENTION

The present invention relates to a waste gas processing apparatus for semiconductor fabricating equipment, and more particularly, to a waste gas processing apparatus for semiconductor fabricating equipment comprising means for spraying water into a waste gas stream produced during a variety of semiconductor device fabricating processes, and removing some of the water which has, as a result, become entrained in the waste gas stream before the resulting partly demisted waste gas stream, still containing some vapor enters an exhaust duct for being further processed, or exhausted.

In many industrial fabrication processes, including semiconductor device of fabrication, a target to fabricate is processed with gas. After use of the gas in processing results in generation of a waste gas, another process for processing waste gas is practiced. In semiconductor fabrication, a reason for processing the waste gas is to reduce the propensity of the waste gas to gas be corrosive to metal.

FIG. 1 is a schematic view of an example of waste gas process apparatus of conventional semiconductor fabricating equipment, used on a path through which waste gas produced after the semiconductor device fabricating process is processed. This waste gas processing apparatus comprises an intake tube 11 for accepting waste gas from a processing chamber (not shown), a water spraying chamber 10 having a water sprayer for spraying water into waste gas entering the intake tube 11, a drain hole 15 installed on the bottom of the water the spraying chamber, in order to discharge water 14 impounded in water spraying chamber 10, an exhaust duct 19, an exhaust tube 17, and one end of which, outlet 16, is placed within the water spraying chamber 10, and the other end of which is coupled to the exhaust duct 19, so as to discharge water-sprayed waste gas into the exhaust duct.

In that configuration of the waste gas processing apparatus, waste gas processing is as follows. After a predetermined reaction in the processing chamber, the waste gas comes into water spraying chamber 10 through the intake tube 11. Here, if the solubility to water, of the gas which is contained in the waste gas and is to be processed, is great, the water spraying chamber 10 sprays water into the waste gas entering water spraying chamber 10, in order to remove and/or to dilute the target gas or reduce the overall temperature of the waste gas. The water 14 which, in use, becomes impounded on the bottom of the water spraying chamber 10, is discharged through the drain hole 15. The waste gas which has become diluted and/or cooled as a result of the water spraying step enters exhaust tube 17 along with vapor contained in this humidifying waste gas stream, through the outlet 16 which is located inside the water spraying chamber 10, and then enters the exhaust duct 19 which is coupled to the exhaust tube 17.

In this case, some of the vapor contained in the waste gas which gas discharged into exhaust duct 19 condenses onto the wall of the exhaust duct while the humidified waste gas stream is passing through exhaust duct 19, and that condensed moisture is impounded at a relatively low place in the exhaust duct. The remaining vapor contained in the waste gas flows into the exhaust duct, accelerating corrosion of the exhaust duct in the humidified waste gas stream caused by the waste gas therein. These corrosive agents deteriorate the exhaust duct causing the duct to need to be replaced. As the case may be, the corrosive gas discharged from the deteriorated exhaust duct can seriously deteriorate other equipment within a facility.

It is known that, in order to solve such problems, a demister may be installed on one portion of the exhaust tube through which the waste gas containing vapor passes before entering the exhaust duct, preventing at least some of the vapor from entering the exhaust duct. Usually, such a demister is used for removing remove moisture contained in the gas, and is formed so as to include several superposed narrow nets. Despite operating by reducing the running speed of the gas flowing through the exhaust tube, the demister cannot fully eliminate the flowing of the vapor remaining in the waste gas stream into the exhaust duct, in the waste gas stream. Accordingly, some of the remaining vapor condenses in the exhaust duct, to corrode or deteriorate it.

SUMMARY OF THE INVENTION

Therefore, it is an object of the present invention to provide a waste gas processing apparatus for semiconductor device fabricating equipment having means for effectively removing vapor from a humidified waste gas stream which is to be discharged into an exhaust duct.

In order to accomplish the object of the present invention, there is provided a waste gas processing apparatus for semiconductor device fabricating equipment comprising a water spraying chamber for spraying water into waste gas coming from a processing chamber, and an exhaust tube for communicating the water spraying chamber with an exhaust duct, so that, after water spraying, remaining waste gas from the water spraying chamber is discharged into the exhaust duct. The processing apparatus further includes a demister and an external gas introducing means, for causing external gas to enter the exhaust tube around the demister.

It is desirable that the demister be placed at a portion of the conduit provided for flow of the humidified waste gas from the water spraying chamber to the exhaust to be, which is connected to the exhaust duct so as to be located downstream of the demister along the path through which the water-sprayed waste gas passes, so that the opportunity of condensing vapor increases. The external gas introducing means may be installed both upstream and downstream of where the demister is installed or only upstream of the demister.

For the externally introduced gas, air or nitrogen is used, because what is needed is a gas of low activity which does not cause undesired chemical reactions. In order to remove more vapor within the waste gas while mixing therewith, it is desirable that the temperature of the introduced gas be at least somewhat lower than that of the waste gas passing through the tube between the water spraying chamber and the site where the external gas is introduced.

DETAILED DESCRIPTION OF A PREFERRED EMBODIMENT OF THE INVENTION

Hereinafter, a preferred embodiment of the present invention will be described with reference to FIG. 2 of the attached drawings.

Figure 1:
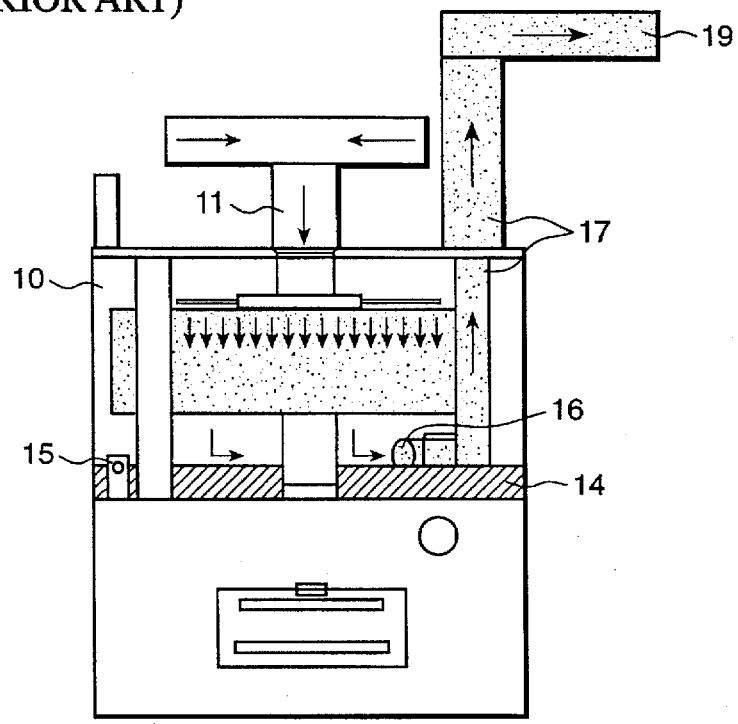
FIG. 1 is a schematic view of the water spraying and humidified waste gas exhausting apparatus a conventional semiconductor device fabricating equipment.
Figure 2:
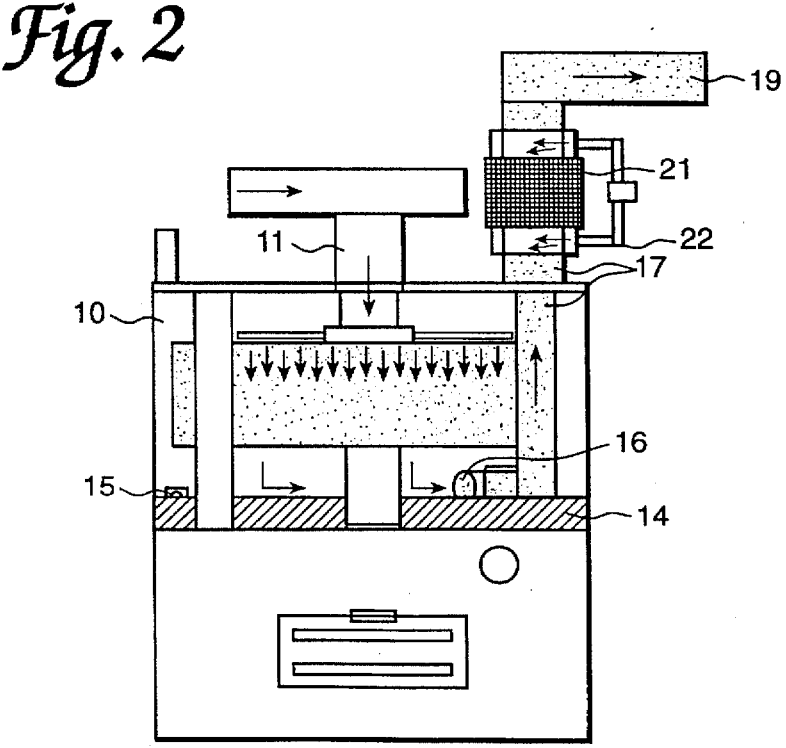
FIG. 2 is a schematic view of an embodiment of the comparable apparatus of semiconductor device fabricating equipment, including the improvements provided in accordance with the principles of the present invention.

Referring to FIG. 2, a stream of waste gas coming from a processing chamber (not shown) enters a water spraying chamber 10 through an intake tube 11. If the solubility to water, of the gas which is contained in the waste gas and to be processed, is great, water spraying chamber 10 sprays water into the waste gas entering water spraying chamber 10, in order to remove or dilute the target gas and/or to reduce the overall temperature of the waste gas. The water 14 which, as a result, becomes impounded on the bottom of the water spraying chamber 10 is discharged through drain hole 15.

The waste gas diluted and/or cooled through water spraying enters exhaust tube 17 along with vapor contained in this waste gas stream through the outlet 16 located inside water spraying chamber 10. The waste gas entering the exhaust tube 17 frequently contains oversaturated vapor. The vapor contained in the waste gas may be condensed into small water drops while passing through a vertically formed portion of the exhaust tube 17.

Waste gas containing a large amount of vapor and condensed water drops passes through the demister 21 and the external gas introducing means 22. Here, due to the demister 21 and the external gas, the pressure of the exhaust tube 17 therearound is raised thereby reducing the running speed of the waste. As a result, because the speed of the small water drops is reduced and their weight is heavy, the small water drops fall in exhaust tube 17, and accumulate in the upstream (in relation to waste gas flow) portion of the demister 21 and collide with one another to become larger, or become attached to the wall of exhaust tube 17. The water drops attached to the inner wall of the exhaust tube upon conglomerating slowly flow down along the inner wall of the vertically formed exhaust tube and then reach outlet 16 and join the water 14 so as to be discharged with it from drain hole 15.

The remaining waste gas from which at least some of the moisture has been removed passes through the demister 21, together with the introduced external gas, and then enters the exhaust duct 19 which is connected to the exhaust tube 17, so as to be discharged to the atmosphere or enter other processing apparatus.

The demister 21 is placed at a portion connected to the exhaust duct 19 which is located at a downstream part of the path (relative to the flow of the waste gas stream), at an upper portion of the vertically formed exhaust tube 17, through which the water-sprayed waste gas passes, so that the opportunity for condensing vapor increases. The external gas introducing means 22 may be installed whose inlets into the exhaust tube 17 are located both upstream and downstream of where demister 21 is installed or only upstream of the demister 21.

For the externally introduced gas, air or nitrogen is used, because gas of low activity which does not cause undesired chemical reactions is appropriate. In order to remove more vapor from the waste gas while mixing therewith, it be desirable that the temperature of the externally incoming gas is at least lower than that of the waste gas passing through the exhaust tube 17. For this, a cooling line is also installed the external gas introducing means 22.

The waste gas processing apparatus for semiconductor fabrication equipment of the present invention reduces the amount of vapor contained in the waste gas discharged to the exhaust duct via the water spraying process, thereby preventing water from being impounded from vapor condensed in the exhaust duct and the exhaust duct, from being corroded due to corrosive gas dissolved in the condensed vapor. In addition, the corrosive gas is prevented from being leaked from the exhaust duct and deteriorating the equipment.

The present invention is not confined to the embodiment, which has been shown and described, but can be modified into a variety of forms within the scope and spirit of the present invention. It will be obvious to the person skilled in the art that these modifications are included within the scope of the following claims.

What is claimed is:

1. A method for treating a waste gas stream evolved from equipment for fabricating semiconductor devices, comprising:

introducing the waste gas stream into a chamber;

in the chamber spraying water into the waste gas of said waste gas stream for thereby producing a wetted waste gas stream and waste water;

draining waste water from said chamber;

venting the wetted waste gas stream upwardly from the chamber via a tube having a length;

intermediate the length of said tube, demisting said wetted waste gas stream using a demister interposed in said tube; and introducing a gas from externally of said tube into said tube, adjacent said demister, thereby adding said gas to said wetted waste gas stream.

2. The method of claim 1, wherein:

said introducing of said gas is performed at least one of upstream and downstream of said demister, relative to flow of said wetted waste gas stream in said tube.

3. The method of claim 1, wherein:

said gas is nitrogen.

4. The method of claim 1, wherein:

said gas is air.

5. The method of claim 1, wherein:

said gas, as introduced, has a lower temperature than that of said wetted waste gas stream, for thereby effectively lowering the propensity of said wetted waste gas stream to carry water up said tube.

6. A waste gas-processing apparatus for semiconductor device-fabricating equipment, comprising:

a water-spraying chamber having a water impoundment in a lower portion thereof;

an intake tube arranged for introducing into said water-spraying chamber a stream of waste gas coming from a processing chamber of a semi-conductor device-fabricating equipment, this waste gas at least one of containing a target gas to be diluted, and an overall temperature to be reduced;

a water sprayer disposed on said chamber and arranged for spraying water into said stream of waste gas within said chamber, whereby some water vapor and water droplets become included in said stream of waste gas stream, and some water which has been sprayed by said water sprayer becomes impounded in said water impoundment;

said water-spraying chamber further including a drain for draining impounded water from said impoundment;

a vertically oriented exhaust tube having a lower, upstream end located within said water-spraying chamber and arranged to exhaust from said water-spraying chamber said waste gas effectively downstream of where water has been sprayed into said waste gas by said water sprayer, so that the waste gas being exhausted via said exhaust tube contains water vapor and water droplets and at least one of said target gas contained therein is diluted and the overall temperature of said waste gas is reduced, relative to said stream of waste gas as introduced into said water-spraying chamber via said intake tube;

said vertically oriented exhaust tube further having an upper, downstream end located outside said water-spraying chamber;

an exhaust duct into which said downstream end of said exhaust tube empties, for exhausting said waste gas to one of the atmosphere and another processing equipment;

a demister interposed in said exhaust tube at an elevated location relative to said lower upstream end of said exhaust tube;

at least one inlet to said exhaust tube for introducing an external gas into said exhaust tube adjacent said demister for contact in said exhaust tube with said waste gas containing water vapor and water droplets, for reducing corrosiveness of said waste gas towards said exhaust duct prior to entry of said waste gas into said exhaust duct;

said lower, upstream end of said exhaust tube including an outlet for draining to said impoundment from said exhaust gas, water descending in said exhaust tube as a result of de-entrainment and condensation of water from said waste gas occurring within said exhaust tube at least partially due to vertical orientation of said exhaust tube and at least partially due to introduction of said external gas adjacent said demister into said exhaust tube.

7. The waste gas-processing apparatus of claim 6, wherein:

said at least one inlet to said exhaust tube for introducing an external gas communicates with said exhaust tube upstream, with regard to flow of said waste gas, of said demister.

8. The waste gas processing apparatus of claim 6, wherein:

said at least one inlet to said exhaust tube for introducing an external gas communicates with said exhaust tube both upstream and downstream, with regard to flow of said waste gas, of said demister.

9. The waste gas-processing apparatus of claim 6, wherein:

said at least one inlet to said exhaust tube for introducing an external gas is constituted by an inlet for introducing one of air and nitrogen to serve as said external gas.

10. The waste gas-processing apparatus of claim 6, wherein:

said at least one inlet to said exhaust tube for introducing an external gas is arranged to introduce an external gas which is lower in temperature than said waste gas where said external gas enters said exhaust tube, for thereby cooling said waste gas by said contact with said external gas.

* * * * *